US008666314B2

(12) United States Patent
Lotter et al.

(10) Patent No.: US 8,666,314 B2
(45) Date of Patent: Mar. 4, 2014

(54) BLUETOOTH TRANSMISSION FACILITY FOR HEARING DEVICES, AND CORRESPONDING TRANSMISSION METHOD

(75) Inventors: Thomas Lotter, Nürnberg (DE); Jürgen Reithinger, Neunkirchen am Brand (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1532 days.

(21) Appl. No.: 11/823,041

(22) Filed: Jun. 26, 2007

(65) Prior Publication Data

US 2008/0013763 A1 Jan. 17, 2008

Related U.S. Application Data

(60) Provisional application No. 60/816,435, filed on Jun. 26, 2006.

(51) Int. Cl.
*H04B 7/00* (2006.01)

(52) U.S. Cl.
USPC ....... 455/41.2; 455/556.1; 381/312; 381/315; 381/23.1

(58) Field of Classification Search
None
See application file for complete search history.

(56) References Cited

U.S. PATENT DOCUMENTS

| | | | | |
|---|---|---|---|---|
| 5,721,783 | A * | 2/1998 | Anderson | 381/328 |
| 6,208,740 | B1 | 3/2001 | Grever | |
| 6,229,900 | B1 * | 5/2001 | Leenen | 381/314 |
| 6,240,194 | B1 * | 5/2001 | De Koning | 381/315 |
| 7,689,248 | B2 * | 3/2010 | Valve et al. | 455/556.1 |
| 7,751,578 | B2 * | 7/2010 | Arz et al. | 381/315 |
| 8,169,938 | B2 * | 5/2012 | Duchscher et al. | 370/310 |
| 8,503,703 | B2 * | 8/2013 | Eaton et al. | 381/312 |

(Continued)

FOREIGN PATENT DOCUMENTS

| | | | |
|---|---|---|---|
| DE | 10200796 | A | 7/2003 |
| DE | 10 2005 005 603 | | 8/2006 |
| WO | 2005/091529 | A1 | 9/2005 |

OTHER PUBLICATIONS

Bluetooth Audio Video Working Group, "Advanced Audio Distribution Profile Specification", Adopted version 1.0, May 11, 2003, pp. 1-75, XP002632596.

Communication From Australian Patent Office dated Nov. 19, 2008, citing references submitted with USPTO Jan. 23, 2009, pp. 1-3.

(Continued)

*Primary Examiner* — Nay A Maung
*Assistant Examiner* — Alejandro Rivero

(57) ABSTRACT

A wireless audio transmission, for example from a television to a hearing device, is to be achieved simply and with a low signal delay. For this purpose are proposed a transmission facility with a transmission device for transmitting audio data in a signal conforming to a Bluetooth® communications protocol, a hearing-aid-specific coder which is integrated into the transmission device for the purpose of compressing the audio data before its transmission, and a relay station for converting the Bluetooth® signal from the transmission device into a signal for inductive transmission to the hearing device. In the relay station, no recoding is performed during the conversion. The transmission device transmits in accordance with the Bluetooth® A2DP protocol. The hearing-aid-specific coder has a lower sampling rate than the standard Bluetooth® coder SBC. Encoding delays and processing delays in the relay station can be minimized by this system.

17 Claims, 1 Drawing Sheet

(56) References Cited

U.S. PATENT DOCUMENTS

| | | | | |
|---|---|---|---|---|
| 2003/0063764 | A1* | 4/2003 | Maltan et al. | 381/315 |
| 2006/0039577 | A1* | 2/2006 | Sanguino et al. | 381/315 |
| 2006/0177081 | A1 | 8/2006 | Bauml et al. | |
| 2006/0270347 | A1* | 11/2006 | Ibrahim et al. | 455/41.2 |
| 2008/0049957 | A1* | 2/2008 | Topholm | 381/315 |

OTHER PUBLICATIONS

Communication From Chinese Patent Office Dated Feb. 5, 2010, citing references submitted with USPTO Feb. 17, 2010, pp. 1-5.

Communication From European Patent Office Dated Apr. 21, 2011, citing references submitted with USPTO May 10, 2011, pp. 1-7.

* cited by examiner

BLUETOOTH TRANSMISSION FACILITY FOR HEARING DEVICES, AND CORRESPONDING TRANSMISSION METHOD

CROSS REFERENCE TO RELATED APPLICATIONS

The present application claims the benefit of the provisional patent application filed on Jun. 26, 2006, and assigned application No. 60/816,435, which is incorporated by reference herein in its entirety.

FIELD OF THE INVENTION

The present invention relates to a transmission facility for transmitting audio data to a hearing device, with a transmission device for sending audio data in a Bluetooth signal, a coder which is integrated into the transmission device, for compressing the audio data before its transmission and a relay station for converting the Bluetooth signal from the transmission device into a signal for inductive transmission to the hearing device. Furthermore, the present invention relates to a corresponding method for transmitting audio data to a hearing device.

BACKGROUND OF THE INVENTION

There is an ever increasing need for the wireless broadband transmission of audio data for speech or music, from televisions or hi-fi devices, to hearing devices. In particular, transmission should also be possible to a hearing device system with two hearing devices, for the binaural supply.

For the purpose of cordless audio transmission to hearing devices, use is made mainly of FM or infrared devices. These are devices which are worn in place of a hearing device, which are offered as plug-on modules for hearing devices or which are integrated into a hearing device with the need for significant additional space.

For audio transmission, several electromagnetic transmission paths can basically be considered. Thus it is possible, for example, to make use of high-frequency far-field transmission systems and inductive near-field transmission systems. By using a digital, inductive transmission system, it is possible to cover short distances (less than 1 to 2 m) to a hearing device with a saving of space and power. However, for audio transmissions from televisions or hi-fi systems, sensible operation requires a far-field transmission system for larger distances (range approx. 10 m).

From the post-published patent application DE 10 2005 005 603.2, a data transmission facility for wireless transmissions to a hearing device is known, which contains a high-frequency receiving device for receiving a high-frequency, modulated signal from an external transmission unit. A mixing device is used to mix the high-frequency modulated signal with a reference signal of a similarly high frequency, so that a modulated output signal can be generated, the carrier frequency of which is at least one order of magnitude lower, and which is suitable for inductive transmission. Finally, the output signal is transmitted inductively to the hearing device by a transmission device. This conversion method results in a minimal delay time over the entire radio link, because it omits completely any demodulation and decoding plus re-modulation and re-encoding. However, a disadvantage of this transmission is that the entire radio link must be individually established, because the data transmission rate in the high-frequency transmission section and the data transmission rate in the section using inductive transmission must be individually adjusted.

SUMMARY OF THE INVENTION

The object of the present invention thus consists in proposing a transmission facility and a corresponding transmission method which involves lower development costs.

This object is achieved in accordance with the invention by a transmission facility for the transmission of audio data to a hearing device with a transmission device for transmitting the audio data in a Bluetooth signal, a coder which is integrated into the transmission device, for compressing the audio data before its transmission, and a relay station for converting the Bluetooth signal from the transmission device into a signal for inductive transmission to the hearing device, such that when the conversion is carried out in the relay station no recoding is performed, the transmission device transmits in accordance with the Bluetooth A2DP protocol, and the coder works at a lower sampling rate than a standard A2DP coder.

Correspondingly, in accordance with the invention a method is also proposed for the transmission of audio data to a hearing device by the encoding of the audio data, transmission of the audio data to a relay station in a Bluetooth signal and conversion of the Bluetooth signal into a signal for inductive transmission to the hearing device, such that no encoding is performed during the conversion, the transmission is effected in accordance with the Bluetooth A2DP protocol and the encoding is performed with a lower sampling rate than for a standard A2DP coder because it is the hearing device clock-pulse rate.

It is thus advantageously possible to make use of standardized components such as Bluetooth transmitters and Bluetooth receivers, together with the appropriate Bluetooth transmission protocol. The standardized components of the BT transmission system are tailored for audio applications (e.g. error protection).

The transmission of data in accordance with the invention can if necessary be bidirectional. It is thus also possible for data from the hearing device to be communicated to an external device over the partially standardized transmission link.

The relay station will preferably be integrated into a remote control for the hearing device or hearing devices, as applicable, or possibly even into a television remote control, for example. The user would thereby not need an additional device for the wireless data transmission.

It is expedient if the audio bandwidth after the compression by the coder is less than 15 kHz. In particular, the audio bandwidth will lie between 8 and 12 kHz. By this means, the audio stream will be compressed as far back as the transmission side in such a way that no unprocessable data arrives at the hearing device.

It is further advantageous if the data transmission rate for the Bluetooth signal is under 150 kbit/s. This means that no special compression must be effected for an inductive transmission in the baseband.

BRIEF DESCRIPTION OF THE DRAWINGS

The present invention will now be explained in more detail by reference to the attached drawings, which show.

DETAILED DESCRIPTION OF THE INVENTION

The exemplary embodiment outlined in more detail below represents a preferred form of embodiment of the present invention. However, so that the invention can be better understood, a transmission system in accordance with the prior art as known internally, which is shown schematically in FIG. 1, will first be explained.

Figure 1:
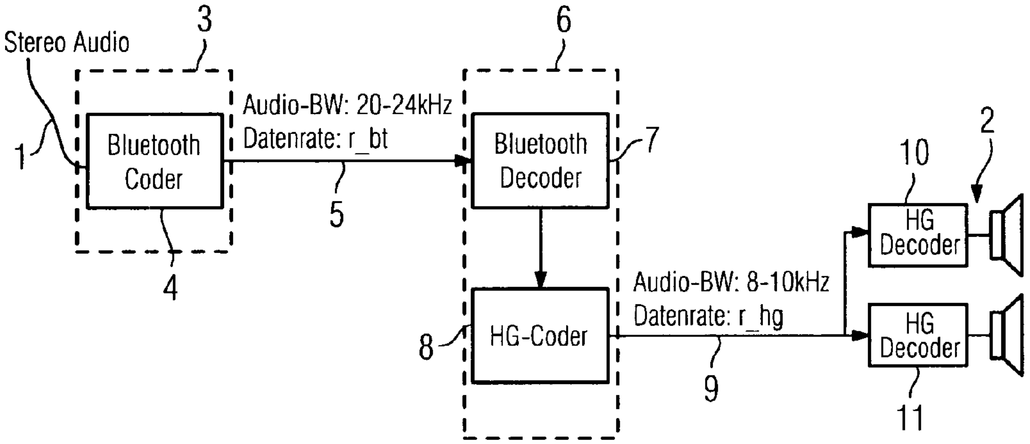
FIG 1 Prior Art
FIG. 1 a transmission system with a relay station for decoding and re-encoding, FIG. 2 a transmission system in accordance with the invention, with a relay station and no re-encoding.

As shown for the system in FIG. 1, a stereo audio signal 1 is to be transmitted from a television or from a hi-fi system to a hearing device or a hearing device system for binaural feed, as applicable. The audio signals 1 are sampled and encoded in a Bluetooth transmitter 3. During this encoding, the data is compressed and combined in blocks. The Bluetooth transmitter 3 supports several standard coders, of which one coder 4 can optionally be used for the transmission. In Bluetooth A2DP the audio signal 1 is typically sampled at 44.1 or 48 kHz, so that an audio bandwidth of 20 to 24 kHz results for the transmitted signal. The data transmission rate r_bt is typically 230 to 350 kbit/s. The standard Bluetooth transmission link 5 permits wireless communication over a range of up to approx. 10 m.

A standard Bluetooth receiver with a compatible Bluetooth decoder 7 is arranged in a remote control 6, in order to decode the encoded audio data on the Bluetooth transmission link 5. For the subsequent inductive transmission to the hearing device system 2, the data transmission rate must be reduced to the value r_hg. For this reason, a hearing device coder 8 is provided, in the remote control 6, which reduces the data transmission rate appropriately and supplies an audio bandwidth of 8 to 10 kHz. Encoded in this way, the data is sent over the inductive transmission link 9 to the hearing device system 2. Each hearing device in the hearing device system 2 has an appropriate hearing device decoder 10, 11.

Thus, the greater distance from a television or a hi-fi system to the hearing device can be bridged with minimal effort and at minimal costs by using a standard transmission method to a hearing device remote control. The Bluetooth method is used as the standard transmission method, this representing the most widespread standard for cordless stereo audio transmissions within a house. The "last yard" from the remote control to the hearing device is then bridged inductively.

In concrete terms, the audio signal is digitized in the Bluetooth transmission station 3 and, using the standardized audio transmission protocol A2DP, is transmitted to the relay station, namely the remote control 6. This standard protocol stipulates support for a license-free codec, namely SBC. As well as this, other defined codecs can also be used, e.g. MP3, although these are not suitable for TV operation (because of the high algorithmic delay). In addition, the standard offers the possibility of defining/using a manufacturer-dependent codec.

As already mentioned above, comparatively high data volumes are transmitted according to the standard on the Bluetooth link 5. For SBC, the data transmission rate is r_bt=230 to 350 kbit/s. However, the transmission to the hearing devices should be effected with the smallest possible components and saving as much current as possible. For this reason, an inductive transmission link 9 is selected here, for which however the data transmission rate must be reduced in order to increase the efficiency and to permit a corresponding power saving. The data reduction is effected by the recoding of the Bluetooth A2DP data stream to a hearing device data stream in the relay station or the remote control 6, as applicable.

The solution depicted in FIG. 1 for the wireless radio transmission link does, however, have some disadvantages. On the one hand, the Bluetooth data transmission in accordance with the standard with its high bandwidth is inefficient for operation with a hearing device. The reason for this lies in the fact that, because of different quality requirements, hearing devices are normally operated with a lower audio bandwidth (approximately 8 to 10 kHz) than audio applications for those with normal hearing (greater than 20 kHz). In addition to this, the recoding in the relay station leads to a reduced audio quality, and produces an increased current consumption, as a result of which the endurance of the relay station is reduced. A further disadvantage consists in the fact that the delay time for speech and music, from the television to the hearing device, is increased, because of the duplicated encoding delay (long audio blocks on the Bluetooth link) and the processing delays of the remote control. This must be considered critical in that synchronicity ought to be ensured between the audio transmission, from the television to the hearing device, and the images, and that the overlaying of direct sound from the television by the transmitted audio signal produces an unwanted coloration or echoing of the music or speech signal.

Figure 2:
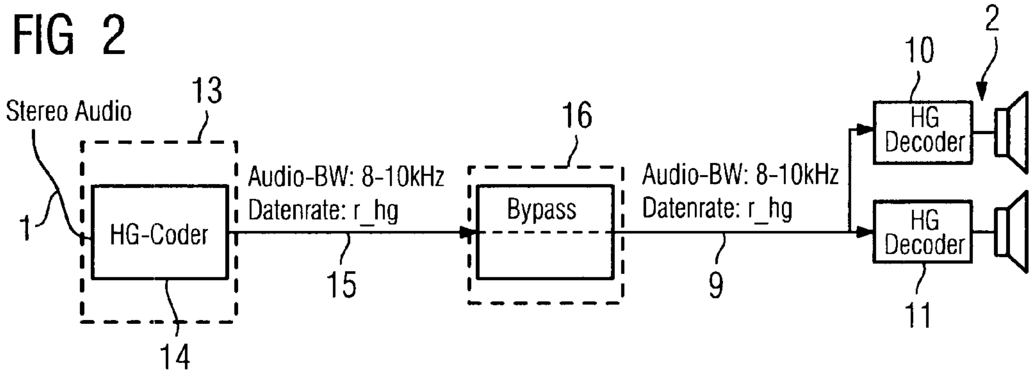

In accordance with the invention therefore, the system which is illustrated in principle in FIG. 2 is used. In a transmission station 13, the TV or hi-fi signal 1 is transposed with the aid of a hearing device coder 14 into a desired hearing device format. This is distinguished by an audio bandwidth of 8 to 10 kHz. Apart from this, the signal is so encoded by the hearing device coder 14 as to produce a data rate r_hg which is suitable for the following inductive transmission link. This is realized by an appropriate block length for the data blocks.

The hearing device coder 14 by which the stereo signal is, after digitization, compressed with a hearing device sampling rate, acts as an alternative to the SBC coder, conforming to the standard, in the Bluetooth A2DP application. The SBC can also be supported in the transmitter, but is not used for the hearing device application. The remaining part of the physical transmission according to the Bluetooth A2DP protocol can be applied without change for the Bluetooth transmission link 15.

In the remote control 16, the Bluetooth data stream is received in the hearing device format by a standard Bluetooth receiver, and can be passed on to an inductive transmitter in the remote control 16 without recoding or conversion of the digital sampling rate. The Bluetooth receiver and the inductive transmitter are therefore symbolized in FIG. 2 as a bypass 17. The remaining data transmission link, namely the inductive transmission link 9 together with the hearing device system 2 with the hearing device coders 10 and 11, corresponds to that of FIG. 1. Thus, for the entire transmission shown in FIG. 2 the payload data rate and the clock rate on the Bluetooth link 15 correspond to that on the inductive transmission link 9, i.e. r_bt=r_hg.

Because the Bluetooth standard is used, the major part of the transmission link to the hearing device frame can be simply and cost-effectively realized, with little development work. The "last yard" to the hearing device is effected in a particularly energy-saving way by means of the inductive link 9. The relocation of the hearing device coder and the sampling at the hearing device clock rate in the Bluetooth transmission station 13 brings the following advantages:

a) The efficiency can be raised in the transmission station and in the remote control. Namely, the Bluetooth transmission in accordance with the A2DP protocol can be carried out at a significantly lower data transmission rate than in the standard application using SBC. This will lower the current consumption in the transmission and relay station. Apart from which, the demanding recoding in the remote control no longer takes place, which leads to further current savings.

Hence a longer battery between-charge time or less frequent battery change, as applicable, can be achieved.

b) Because both Bluetooth codec (coding/decoding) and also hearing device codec represent transformations with losses, the audio quality of the overall signal is raised, because in the system in accordance with the invention shown in FIG. 2 it is only necessary to encode/decode once.

c) An important quality attribute of the overall system is the delay of the audio signal due to the transmission. On the one hand, in the TV application direct sound from the television is overlaid at the hearing device wearer's ear with the signal transmitted by radio, which leads to annoying coloration or echoing. On the other hand, it is necessary to ensure the synchronicity of the image with the sound. With the method in accordance with the invention, the delay time is minimized by the elimination of an encoding delay and a processing delay in the remote control.

The invention claimed is:

1. A transmission facility for transmitting audio data to a hearing aid device, comprising:

a wireless transmission device that receives an audio signal;

a coder in the wireless transmission device that encodes the audio signal into an audio data stream comprising a digital encoding and a data rate that are both compatible with a decoder in the hearing aid device, wherein the wireless transmission device transmits the audio data stream wirelessly over a first transmission link in said digital encoding and at the data rate;

a remote control configured to control the wireless transmission device and which is physically separate from the wireless transmission device and the hearing aid device; and a relay station integrated in the remote control to receive the audio data stream over the first transmission link, and to retransmit the audio data stream in said digital encoding and at the data rate to the hearing aid device over a second transmission link without recoding of the audio data stream.

2. A transmission facility as claimed in claim 1, wherein both the first and second transmission links use an A2DP SBC data communications protocol.

3. A transmission facility as claimed in claim 2, wherein the first transmission link uses radio frequency transmission, and the second transmission link uses inductive transmission.

4. A transmission facility as claimed in claim 1, wherein the coder compresses the audio signal to create the audio data stream at the compatible data rate.

5. A transmission facility as claimed in claim 1, wherein the coder acts as an alternative to an A2DP SBC codec in the wireless transmission device, and encodes the audio data stream according to an A2DP SBC communications protocol at a sampling frequency of less than 44.1 kHz.

6. A transmission facility as claimed in claim 5, wherein an audio bandwidth of the audio data after the encoding is less than 15 kHz.

7. A transmission device for transmitting audio data to a hearing aid device according to a A2DP protocol, comprising:

a coder integrated into the transmission device that encodes the audio data to a signal at a lower sampling rate than 44.1 kHz in a format of the hearing aid device;

a remote control comprising a device configured to control the transmission device and which is physically separate from the transmission device and the hearing aid device; and a relay station integrated in the remote control to receive the signal from the transmission device over a first wireless transmission link at the lower sampling rate in the format of the hearing aid device, and to convert the signal for inductively transmitting to the hearing aid device over a second wireless transmission link at the lower sampling rate in the format of the hearing aid device without recoding of the signal.

8. The transmission device as claimed in claim 7, wherein the audio data is bidirectionally transmitted.

9. The transmission device as claimed in claim 7, wherein an audio bandwidth of the audio data after the encoding is less than 15 kHz.

10. The transmission device as claimed in claim 9, wherein the audio bandwidth is between 8 kHz and 12 kHz.

11. The transmission device as claimed in claim 7, wherein a data transmission rate in the signal is less than 150 kbit/s.

12. The transmission device of claim 1, wherein the transmission device comprises a transmission device selected from the group consisting of a television, and a sound-reproduction device.

13. A method for transmitting audio data to a hearing aid device according to a A2DP protocol, comprising:

encoding the audio data to a signal by a coder at a lower sampling rate than 44.1 kHz;

providing a remote control configured to control a transmitting device transmitting the audio data, wherein the remote control is physically separate from the transmitting device and the hearing aid device;

integrating a relay station in the remote control;

transmitting the signal over a first wireless transmission link to the relay station at the lower sampling rate in a format of the hearing aid device;

converting the signal in the relay station to an inductive signal without recoding of the signal; and inductively transmitting to the hearing aid device the converted signal from the relay station over a second wireless transmission link at the lower sampling rate and in the format of the hearing aid device.

14. The method as claimed in claim 13, wherein the audio data is bidirectionally transmitted.

15. The method as claimed in claim 13, wherein an audio bandwidth of the audio data after the encoding is less than 15 kHz.

16. The method as claimed in claim 15, wherein the audio bandwidth is between 8 kHz and 12 kHz.

17. The method as claimed in claim 13, wherein a data transmission rate in the signal is less than 150 kbit/s.

* * * * *